US010073662B2

(12) United States Patent
Park

(10) Patent No.: US 10,073,662 B2
(45) Date of Patent: Sep. 11, 2018

(54) IMAGE FORMING APPARATUS AND METHOD OF RECOVERING ERROR THEREOF

(71) Applicant: S-Printing Solution Co., Ltd., Suwon-si (KR)

(72) Inventor: Hyun-wook Park, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/290,602

(22) Filed: Oct. 11, 2016

(65) Prior Publication Data
US 2017/0123736 A1  May 4, 2017

(30) Foreign Application Priority Data
Nov. 3, 2015  (KR) .................... 10-2015-0154047

(51) Int. Cl.
*G06F 3/12*  (2006.01)
(52) U.S. Cl.
CPC .......... *G06F 3/121* (2013.01); *G06F 3/1234* (2013.01); *G06F 3/1236* (2013.01)
(58) Field of Classification Search
CPC combination set(s) only.
See application file for complete search history.

(56) References Cited

U.S. PATENT DOCUMENTS

| 8,849,890 B2 | 9/2014 | Nakamoto |
| 8,994,993 B2 | 3/2015 | Nishiguchi |
| 9,036,173 B2 | 5/2015 | Thomas et al. |
| 9,503,592 B2* | 11/2016 | Fein ...................... G06F 3/1204 |
| 2003/0088727 A1* | 5/2003 | Zarns .................. H04L 12/4625 710/313 |
| 2004/0239713 A1 | 12/2004 | Kang |
| 2005/0262262 A1* | 11/2005 | Chang .................. G06F 13/426 709/232 |
| 2006/0149992 A1* | 7/2006 | Shima ................. G06F 11/0733 714/4.1 |
| 2013/0114100 A1* | 5/2013 | Torii ................... G06F 11/0733 358/1.14 |
| 2014/0218763 A1 | 8/2014 | Takahashi et al. |

FOREIGN PATENT DOCUMENTS

| JP | 2013-030983 A | 2/2013 |
| JP | 2014-150414 A | 8/2014 |
| KR | 10-2004-0104056 A | 12/2004 |
| KR | 10-2015-0050181 A | 5/2015 |

* cited by examiner

*Primary Examiner* — Barbara D Reinier
(74) *Attorney, Agent, or Firm* — Jefferson IP Law, LLP

(57) ABSTRACT

An image forming apparatus and a method of recovering errors of the image forming apparatus connectable to a server for supporting a service for error recovery of the image forming apparatus are provided. The method includes connecting, when connection with the server through a first network is restricted, to a mobile apparatus through a second network different from the first network, transmitting state information required for error recovery of the image forming apparatus to the connected mobile apparatus through the second network, receiving a control command required for error recovery of the image forming apparatus from the mobile apparatus through the second network, in response to the transmitted state information, and recovering errors of the image forming apparatus according to the received control command.

16 Claims, 16 Drawing Sheets

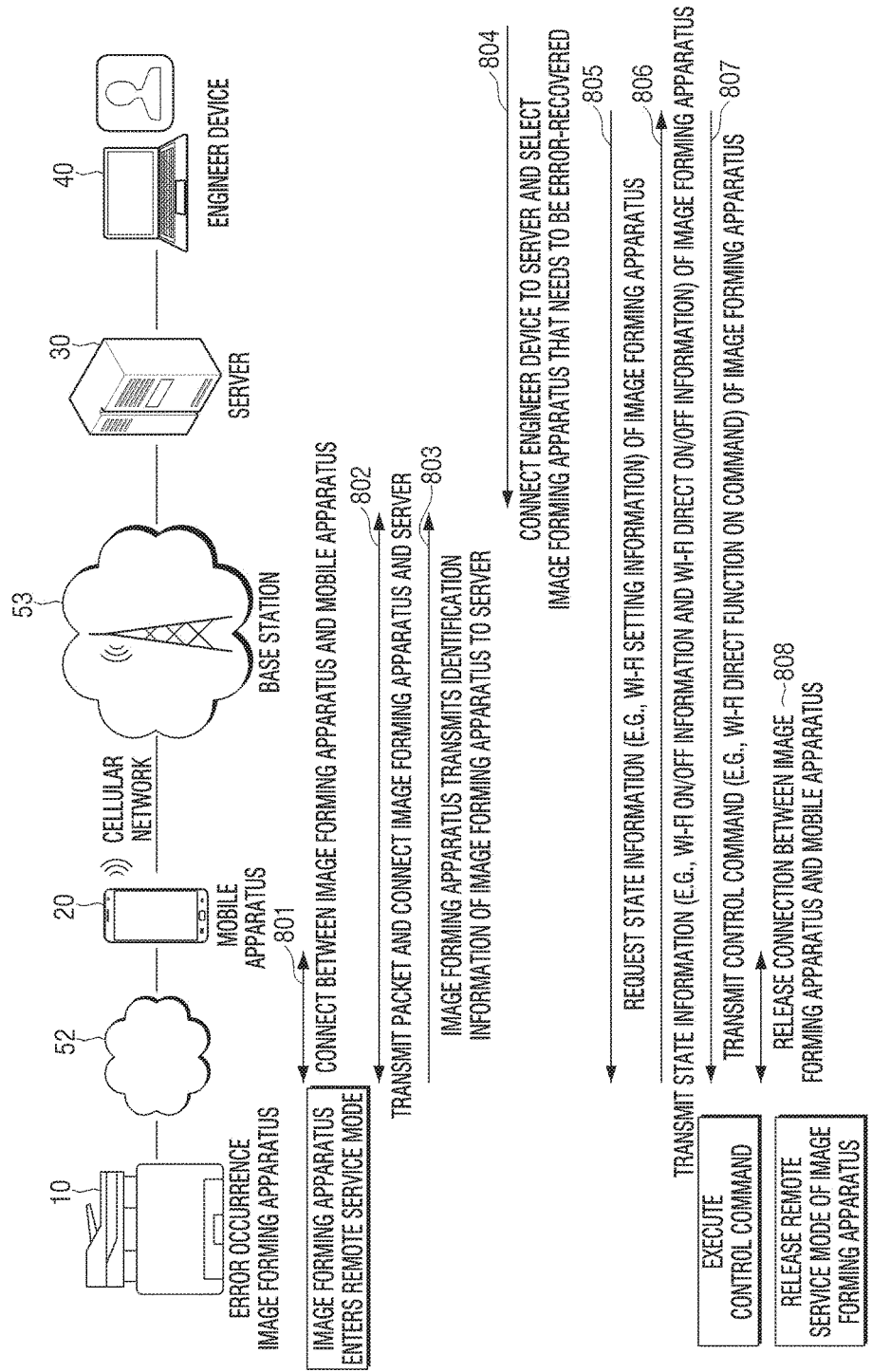

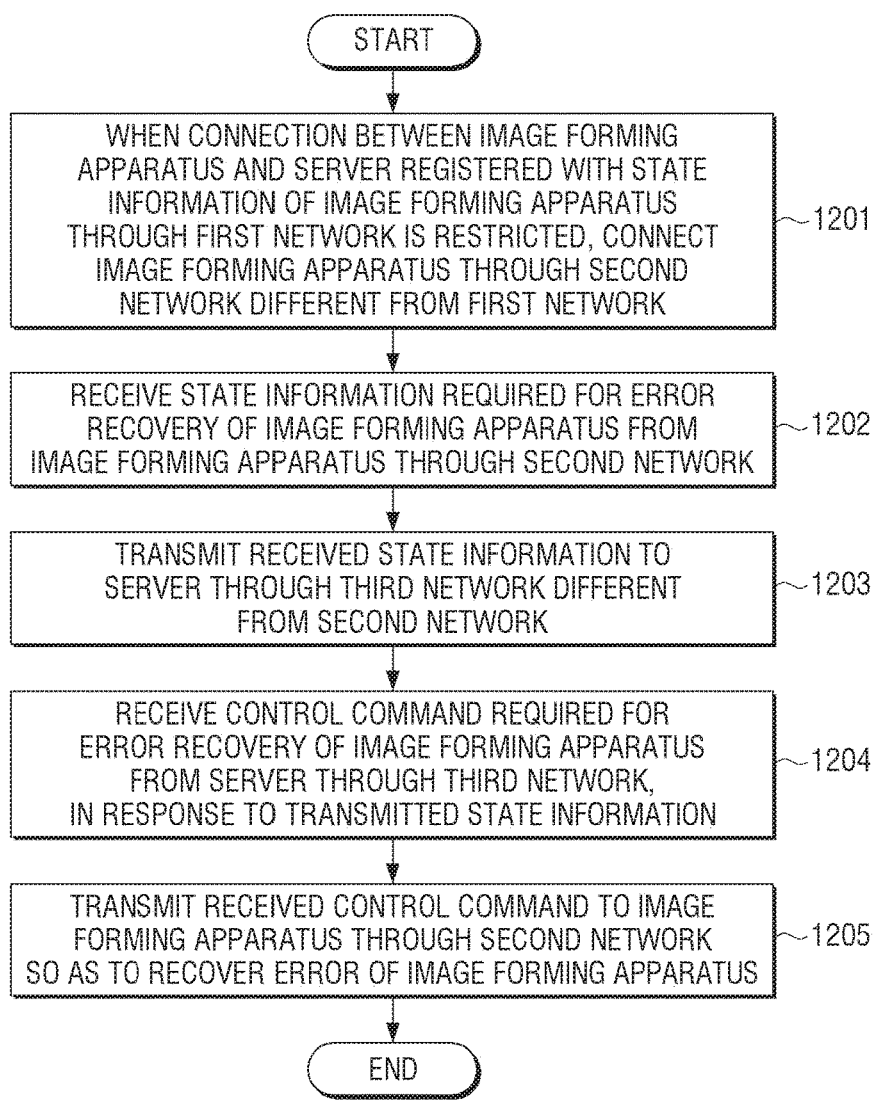

IMAGE FORMING APPARATUS AND METHOD OF RECOVERING ERROR THEREOF

CROSS-REFERENCE TO RELATED APPLICATION(S)

This application claims the benefit under 35 U.S.C. § 119(a) of a Korean patent application filed on Nov. 3, 2015 in the Korean Intellectual Property Office and assigned Serial number 10-2015-0154047, the entire disclosure of which is hereby incorporated by reference.

TECHNICAL FIELD

The present disclosure relates to an image forming apparatus and a method for recovering errors of the image forming apparatus.

BACKGROUND

The present disclosure relates to a method of recovering errors of an image forming apparatus, and more particularly, a method of processing error of an image forming apparatus, for overcoming a problem even if a developer or a service engineer of the image forming apparatus does not visit a place where the problem occurs.

An image forming apparatus outputs a document written by an external apparatus, such as a computer to printing paper, and receives a document written by a computer application program and performs a printing operation according to a set printing condition.

When error occurs during a printing operation, a user may search for a reason for the error in order to address the issue. For example, when the error that occurs during the printing operation is a simple error, such as a paper jam or an empty toner, the problem may be overcome by a user. However, when the error is a defective equipment, such as driver error of an image forming apparatus, the user has a difficulty in searching for a reason for the error. Even if the user discovers the reason for the error, the user cannot know how to address the issue.

In this case, the user may request a service center of an image forming apparatus to address the issue. Upon receiving a service request from the user, the service center may ask the user the type of error and system environments of an image forming apparatus or a computer in order to recognize the problem. However, when the user has insufficient knowledge about the error, the service center has a problem in that the service center cannot address the issue. In this case, a service engineer visits the corresponding place, checks a computer, an image forming apparatus, and the like, recognizes a problem, and attempts to address the issue.

In this case, the service engineer needs to directly visit the corresponding place in order to recognize and address the issue and, thus, much time and costs may be consumed.

Therefore, a need exists for an image forming apparatus and a method for recovering errors of the image forming apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address the above mentioned problems and/or disadvantages and to provide at least the advantages described below. Accordingly, an aspect of the present disclosure is to provide a method of recognizing and overcoming a problem without a visit from a service engineer at a corresponding place when there is an error recovery request of the image forming apparatus.

In accordance with an aspect of the present disclosure, a method of recovering errors of an image forming apparatus is provided. The method includes connecting, when connection with the server through a first network is restricted, to a mobile apparatus through a second network different from the first network, transmitting state information required for error recovery of the image forming apparatus to the connected mobile apparatus through the second network, and receiving a control command required for error recovery of the image forming apparatus from the mobile apparatus through the second network, in response to the transmitted state information, and recovering errors of the image forming apparatus according to the received control command, wherein the control command is received from the server through a third network, in response to state information transmitted to the server by the mobile apparatus through the third network different from the second network.

When the image forming apparatus includes a universal serial bus (USB) driver module installed therein and configured to communicate with the mobile apparatus, the connecting of the mobile apparatus through the second network may include connecting the mobile apparatus according to a USB communication method supported by the USB driver module.

The connecting of the mobile apparatus through the second network may include connecting the mobile apparatus according to a wireless fidelity (Wi-Fi) Direct communication method, a Wi-Fi communication method, or a Bluetooth (BT) communication method.

The connecting of the mobile apparatus through the second network may include connecting the mobile apparatus through a router.

The method may further include receiving a file required for the error recovery from the mobile apparatus through the second network.

The method may further include blocking a specific network port or deactivating a specific function in order to prevent a material stored in the image forming apparatus from being externally exposed.

The connecting of the mobile apparatus through the second network by the image forming apparatus may include providing a user interface for accepting or rejecting connection between the image forming apparatus and the mobile apparatus, and in response to connection between the image forming apparatus and the mobile apparatus being accepted through the user interface, connecting the image forming apparatus to the mobile apparatus through the second network.

The state information required for the error recovery may include at least one of firmware version information, an error occurrence code, consumables usage information, a graphics user interface (GUI) image, a remote-UI (RUI) image or link state, log information, system setting information, paper cassette setting information, printer setting information, copy setting information, facsimile setting information, scan setting information, network setting information, and security setting information of the image forming apparatus.

The control command required for the error recovery may include at least one of a command for upgrading firmware of the image forming apparatus to a recent version, a command for displaying a GUI image or RUI image for remote access, a command for changing setting information, and a command for powering on/off or rebooting software.

The image forming apparatus may be connected to the mobile apparatus through the second network according to local distance communication, and the mobile apparatus may be connected to the server through a third network according to a remote distance communication method.

In accordance with another aspect of the present disclosure, a method of recovering errors of an image forming apparatus of a mobile apparatus is provided. The method includes connecting, when connection between the image forming apparatus and a server for supporting a service for error recovery through a first network is restricted, to the image forming apparatus through a second network different from the first network, receiving state information required for error recovery of the image forming apparatus from the image forming apparatus through the second network, transmitting the received state information to the server through a third network different from the second network, receiving a control command required for error recovery of the image forming apparatus from the server through the third network, in response to the transmitted state information, and transmitting the received control command to the image forming apparatus through the second network to recover an error of the image forming apparatus.

The method may further include acquiring surrounding information of the image forming apparatus, and transmitting the acquired surrounding information to the server through the third network.

In accordance with another aspect of the present disclosure, an image forming apparatus connectable to a server for supporting a service for error recovery of the image forming apparatus is provided. The apparatus includes a network interface configured to connect to the server through a first network and connect to a mobile apparatus through a second network different from the first network, a work performer including at least one of a scan module, a facsimile module, a copy module, and a print module, and a processor configured to control the network interface to transmit state information required for error recovery of the image forming apparatus to the mobile apparatus through the second network when connection with the server through the first network is restricted and to receive a control command required for the error recovery of the image forming apparatus from the mobile apparatus through the second network, in response to the transmitted state information, and to recover an error of the image forming apparatus according to the received control command, wherein the control command is received from the server through the third network, in response to state information transmitted to the server by the mobile apparatus through a third network different from the second network.

The image forming apparatus may further include a universal serial bus (USB) driver module configured to communicate with the mobile apparatus, when the network interface is connected to the mobile apparatus through the second network, the network interface may be connected to the mobile apparatus according to a USB communication method supported by the USB driver module.

When the network interface is connected to the mobile apparatus through the second network, the network interface may be connected to the mobile apparatus according to a Wi-Fi Direct communication method, a Wi-Fi communication method, or a BT communication method.

When the network interface is connected to the mobile apparatus through the second network, the network interface may be connected to the mobile apparatus through a router.

The processor may control the network interface to receive a file required for the error recovery from the mobile apparatus through the second network.

The processor may block a specific network port or deactivate a specific function in order to prevent a material stored in the image forming apparatus from being externally exposed.

The image forming apparatus may further include a user interface portion configured to provide a user interface configured to accept or reject connection between the image forming apparatus and the mobile apparatus, and the processor may control the network interface to connect the image forming apparatus to the mobile apparatus through the second network when connection between the image forming apparatus and the mobile apparatus is accepted through the user interface.

The state information required for the error recovery may include at least one of firmware version information, an error occurrence code, consumables usage information, a GUI image, an RUI image or link state, log information, system setting information, paper cassette setting information, printer setting information, copy setting information, facsimile setting information, scan setting information, network setting information, and security setting information of the image forming apparatus.

The control command required for the error recovery may include at least one of a command for upgrading firmware of the image forming apparatus to a recent version, a command for displaying a GUI image or RUI image for remote access, a command for changing setting information, and a command for powering on/off or rebooting software.

The image forming apparatus may be connected to a mobile apparatus through a second network according to a local distance communication method, and the mobile apparatus may be connected to the server through a third network according to a remote distance communication method.

In accordance with another aspect of the present disclosure, a mobile apparatus for recovering errors of an image forming apparatus is provided. The apparatus includes a network interface configured to connect to the image forming apparatus through a second network different from a first network when connection between the image forming apparatus and a server for supporting a service for error recovery through the first network is restricted, and a processor configured to control the network interface to receive state information required for error recovery of the image forming apparatus from the image forming apparatus through the second network, to transmit the received state information to the server through a third network different from the second network, to receive a control command required for error recovery of the image forming apparatus from the server through the third network, in response to the transmitted state information, and transmit the received control command to the image forming apparatus through the second network to recover an error of the image forming apparatus.

The mobile apparatus may further include a detector configured to acquire surrounding information of the image forming apparatus, wherein the processor may control the network interface to transmit the acquired surrounding information through the third network.

In accordance with another aspect of the present disclosure, a recoding medium may record a computer program for executing the methods so as to read the computer program by a computer.

In accordance with another aspect of the present disclosure, a problem of an image forming apparatus may be recognized and overcome without a visit from a service engineer at a corresponding place.

The service engineer may access a server and may remotely recognize and address the issue of the image forming apparatus.

When connection between the image forming apparatus and a server is restricted, the service engineer may access a server and may remotely recognize and address the issue of the image forming apparatus through a mobile apparatus.

In addition, the service engineer may acquire environment information of the image forming apparatus using a camera or various sensors included in the mobile apparatus so as to accurately and rapidly recognize and address the issue of the image forming apparatus.

Other aspects, advantages, and salient features of the disclosure will become to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram illustrating a case in which an error of an image forming apparatus is recovered using a mobile apparatus according to an embodiment of the present disclosure;

FIG. 12 is a flowchart illustrating error recovery of an image forming apparatus in the mobile apparatus according to an embodiment of the present disclosure.

Throughout the drawings, like reference numerals will be understood to refer to like parts, components, and structures.

DETAILED DESCRIPTION

Figure 1:
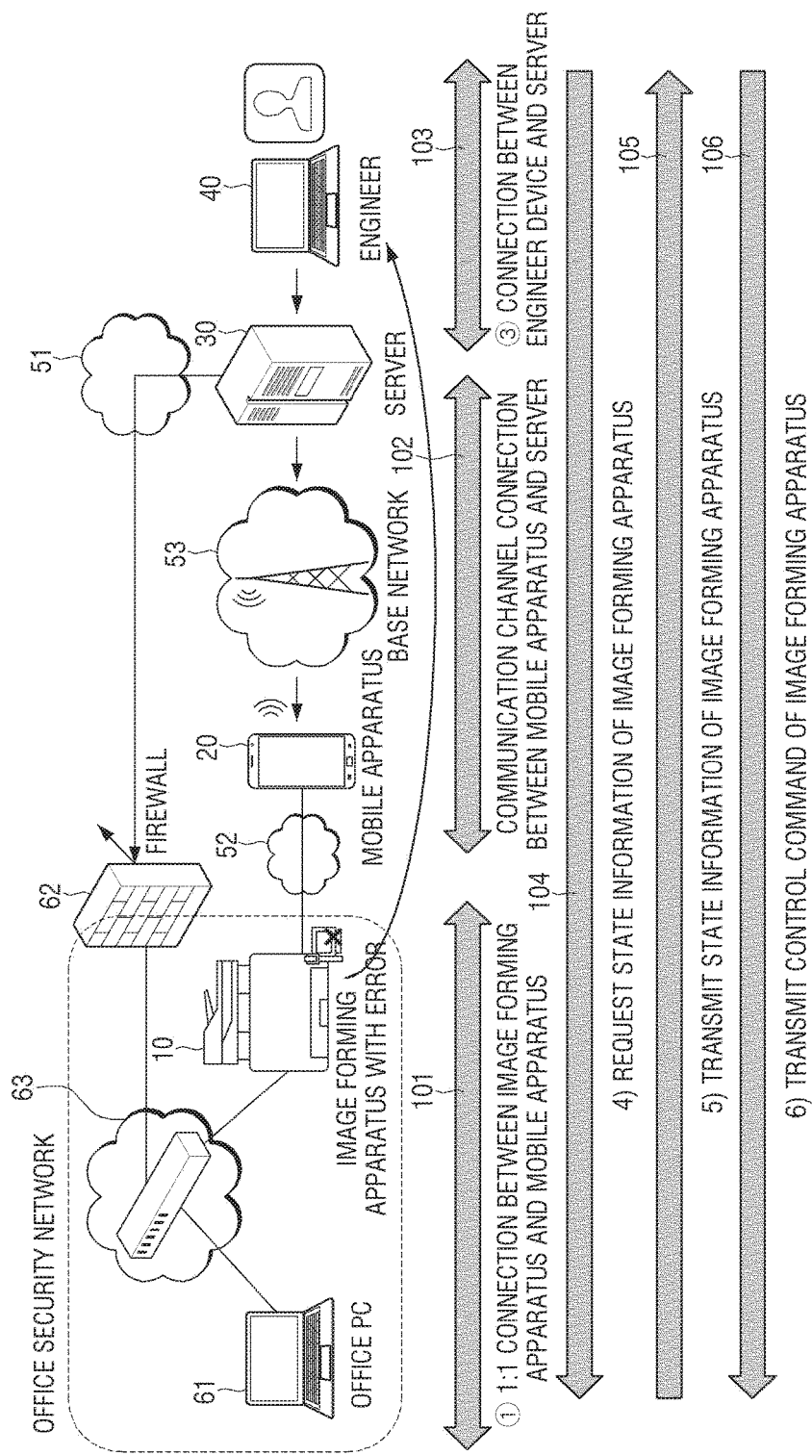
FIG. 1 is a diagram illustrating a situation in which an error of an image forming apparatus is recovered using a mobile apparatus according to an embodiment of the present disclosure.

The following description with reference to the accompanying drawings is provided to assist in a comprehensive understanding of the various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Throughout this specification, the word "comprise" and variations, such as "comprises" or "comprising", will be understood to imply the inclusion of stated features (e.g., numbers, functions, operations, or elements including components) but not the exclusion of any other elements.

Throughout this specification, the expression "A or B", "at least one of A and/or B", or "one or more of A and/or B" may include all combinations of items listed together. For example, the expression "A or B", "at least one of A and B", or "at least one of A and B" may refer to all of (1) inclusion of at least one A, (2) inclusion of at least one B, or (3) inclusion of both at least one A and at least one B.

It will be understood that the terms first, second, third, and the like, may be used in various embodiments of the present disclosure herein to describe various elements irrespective of an order and/or importance and should not be limited by these terms. These terms are only used to distinguish one element from other elements. For example, a first user device and a second user device may refer to different user devices irrespective of an order or importance. For example, a first element could be termed a second element and similarly, a second element could also be termed a third element without departing from the teachings of the present disclosure.

It will be understood that when an element (e.g., a first component) is referred to as being "operatively or communicatively) coupled with/to" or "connected to" another element (e.g., a second component), it may be directly on, connected or coupled to the other element or intervening elements (e.g., a third component) may be present. In contrast, when an element (e.g., a first component) is referred to as being "directly on," "directly connected to" or "directly coupled to" another element (e.g., a second component), there are no intervening elements (e.g., a third component) present.

Throughout this specification, the expression "configured to" may be exchangeably used with, for example, "suitable for", "having the capacity to", "designed to", "adapted to", "made to", or "capable of". The expression "configured to" may not necessarily refer to "specifically designed to" in terms of hardware. Instead, in some situations, the expression "device configured to" may mean that the device is "capable of doing" along with other devices or components. For example, the expression "processor configured to perform A, B, and C" may refer to a generic-purpose processor (e.g., a central processing unit (CPU) or an application processor) that is capable of performing corresponding operations by executing one or more software programs stored in a dedicate processor (e.g., an embedded processor) or a memory device for performing the corresponding operation.

The terms used herein are for the purpose of describing particular embodiments only and are not intended to be limiting of the present disclosure. As used herein, the singular forms are intended to include the plural forms as well, unless the context clearly indicates otherwise. All terms including technical and scientific terms used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. According to the context, even the terms defined in the specification may not be interpreted as excluding embodiments of the present disclosure.

Through this specification, the term user may refer to a person who uses an electronic apparatus or an apparatus (e.g., an artificial intelligence electronic apparatus) that uses an electronic apparatus.

FIG. 1 is a diagram illustrating a situation in which an error of an image forming apparatus is recovered using a mobile apparatus according to an embodiment of the present disclosure.

Referring to FIG. 1, when an image forming apparatus 10 is connectable to a server 30 through a first network 51 that is an external network, connection of the image forming apparatus 10 with the server 30 through the first network 51 as an external network may be restricted by a firewall system 62. In this situation, an error may exist in a specific function of the image forming apparatus 10. In this case, the error of the image forming apparatus 10 needs to be recovered using a remote support terminal (e.g., a personal computer (PC)) 61, and the like, connectable to the image forming apparatus 10, but the remote support terminal 61 is also connected to a same internal network 63 as the image forming apparatus 10 and, thus, connection of the image forming apparatus 10 with the external network 51 may be restricted by, that is, the firewall system 62.

When the image forming apparatus 10 is connectable to the server 30 through the first network 51 as an external network, an error may occur in terms of a function related to the first network 51 as an external network of the image forming apparatus 10.

Accordingly, in order to recover an error of the image forming apparatus 10, in operation 101, the image forming apparatus 10 may be connected to a mobile apparatus 20 through a second network 52 different from the first network 51 as an external network. In this case, the image forming apparatus 10 may be connected to the mobile apparatus 20 in a wired communication method or a wireless communication method. When the wired communication method is used, the image forming apparatus 10 may be connected to the mobile apparatus 20 using a wired communication method, for example, a universal serial bus (USB), a high definition multimedia interface (HDMI), recommended standard 332 (RS-332), a plain old telephone service (POTS), and the like. When the wireless communication method is used, the image forming apparatus 10 may be connected to the mobile apparatus 20 using a near field communication method, for example, Wireless Fidelity (Wi-Fi), Bluetooth (BT), near field communication (NFC), or Zigbee.

When the image forming apparatus 10 is connected to the mobile apparatus 20, in operation 102, the mobile apparatus 20 may be connected to the server 30 through a third network 53 as an external network. In this case, the mobile apparatus 20 may be connected to the server 30 using a wireless communication method. For example, the mobile apparatus 20 may be connected to the server 30 using a local distance communication method, such as long term evolution (LTE), LTE advance (LTE-A), code division multiple access (CDMA), wideband CDMA (WCDMA), universal mobile telecommunications system (UMTS), wireless broadband (WiBro), or Global System for Mobile Communications (GSM).

Accordingly, when the image forming apparatus 10 transmits identification information of the image forming apparatus 10 to the mobile apparatus 20, the mobile apparatus 20 may transmit the identification information of the image forming apparatus 10 to the server 30. Here, the identification information of the image forming apparatus 10 may include, for example, a serial number of the image forming apparatus 10, a media access control (MAC) address, a model name, and the like. The mobile apparatus 20 may also transmit identification information of the mobile apparatus 20 to the server 30. In this case, the mobile apparatus 20 may simultaneously or separately transmit the identification of the image forming apparatus 10 and the identification information of the mobile apparatus 20.

The server 30 may generate a list of image forming apparatuses connected to the server 30 using the received identification information. The server 30 may store and manages the received identification information and connection information, and when the image forming apparatus 10 that has been connected to the server 30 is re-connected to the server 30, the server 30 may adjust or highlight an order of an image forming apparatus on the list or may rapidly connect to the image forming apparatus 10 through the mobile apparatus 20 using pre-stored connection information of the image forming apparatus 10.

Here, the server 30 may include a cloud server. In general, a cloud server may be used as a storing material using a software environment without being affected by fixed hardware. There may be various services types of cloud. For example, a service type may be classified into software as a service (SaaS), platform as a service (PaaS), hardware as a service (HaaS), infrastructure as a service (IaaS), and the like, according to the feature of a service, which are conceptually the same except for a slight difference according to a manufacturing company.

When the mobile apparatus 20 is connected to the server 30, an engineer device 40 for error recovery of the image forming apparatus 10 may be remotely connected to the server 30, in operation 103. In an embodiment of the present disclosure, the engineer device 40 may include a device used by an engineer who provides an error recovery service, a device for allowing the engineer to perform a user input, or an automatic device (e.g., artificial intelligence device) that provides an error recovery service.

An engineer who uses the engineer device 40 may check a list of image forming apparatuses connected to the server 30. The engineer may select the image forming apparatus 10 that needs to be error-recovered with reference to identification information of the image forming apparatus 10 contained in the image forming apparatus list and identification information of the mobile apparatus 20.

According to selection of the image forming apparatus 10 that needs to be error-recovered, the engineer device 40 may be remotely connected to the image forming apparatus 10 through the mobile apparatus 20.

When the engineer device 40 is connected to the image forming apparatus 10, the engineer device 40 may transmit a state information request signal for requesting state information related to error of the image forming apparatus 10 to the image forming apparatus 10 through the mobile apparatus 20, in operation 104.

In response to the state information request signal, the image forming apparatus 10 may transmit state information of the image forming apparatus 10, required for error recovery of the image forming apparatus 10, to the server 30 through the mobile apparatus 20, in operation 105. Here, the state information may include, for example, firmware version information, setting information, an error occurrence code, consumables usage information (e.g., toner usage information), a current GUI image, a remote-UI (RUI) image, a link state, or log information of the image forming apparatus 10. In the state information, the setting information of the image forming apparatus 10 may include at least one of system setting information, paper cassette setting information, print setting information, copy setting information, facsimile setting information, scan setting information, network setting information, and security setting information of the image forming apparatus 10.

In addition, the engineer may remotely control the mobile apparatus 20 to acquire surrounding information of the image forming apparatus 10 using a function of the mobile apparatus 20. For example, according to a remote control command of the engineer device 40 via an input of the engineer, the mobile apparatus 20 may capture an image of image forming apparatus 10, or a surrounding image or moving picture of the image forming apparatus 10 using a camera included in the mobile apparatus 20, and transmit the image to the engineer device 40 through the server 30. The mobile apparatus 20 may acquire position information of the image forming apparatus 10 or position information of the mobile apparatus 20 adjacent to the image forming apparatus 10 using a global positioning system (GPS) sensor of the mobile apparatus 20 and transmit the information to the engineer device 40 through the server 30. The mobile apparatus 20 may acquire information on humidity, altitude, and the like, of a place in which the image forming apparatus 10 is positioned using various sensors included in the mobile apparatus 20 and transmit the information to the engineer device 40 through the server 30.

Accordingly, the engineer device 40 may recover an error of the image forming apparatus 10 so as to maintain the image forming apparatus 10 in an optimal condition in consideration of a surrounding environment of the image forming apparatus 10. As such, the engineer may remotely acquire surrounding information as well as state information of the image forming apparatus 10 and may recover an error of the image forming apparatus 10 using the information, thereby rapidly recognizing error check as well as achieving a similar effect according to control of the image forming apparatus 10 even when offline.

Returning back to operation 105, when the image forming apparatus 10 transmits the state information of the image forming apparatus 10, required for error recovery of the image forming apparatus 10, the engineer device 40 may transmit a control command for error recovery of an image forming apparatus to the image forming apparatus 10 through the mobile apparatus 20 in response to the state information, in operation 106. The control command may be, for example, a command for upgrading firmware of the image forming apparatus 10 to a recent version, a command for displaying a GUI or RUI image for remote access, a command for changing setting information, a command for powering on/off or rebooting software, and the like. The command for changing setting information may be, for example, a command for changing at least one of system setting information, paper cassette setting information, print setting information, copy setting information, facsimile setting information, scan setting information, network setting information, and security setting information.

In response to a control command being received, the image forming apparatus 10 may perform an operation according to the received control command to recover an error of the image forming apparatus 10.

According to another embodiment of the present disclosure, a file required for a control command along with the control command may be received. For example, when a control command is a command for upgrading firmware of the image forming apparatus 10, the file required for the control command may be firmware of a recent version. In this case, the image forming apparatus 10 may upgrade the firmware of the image forming apparatus 10 to a recent version using the received firmware. Accordingly, an error of the image forming apparatus 10 may be recovered.

Various operations performed by the image forming apparatus 10 and the mobile apparatus 20 of FIG. 1 will be described below.

Figure 2:
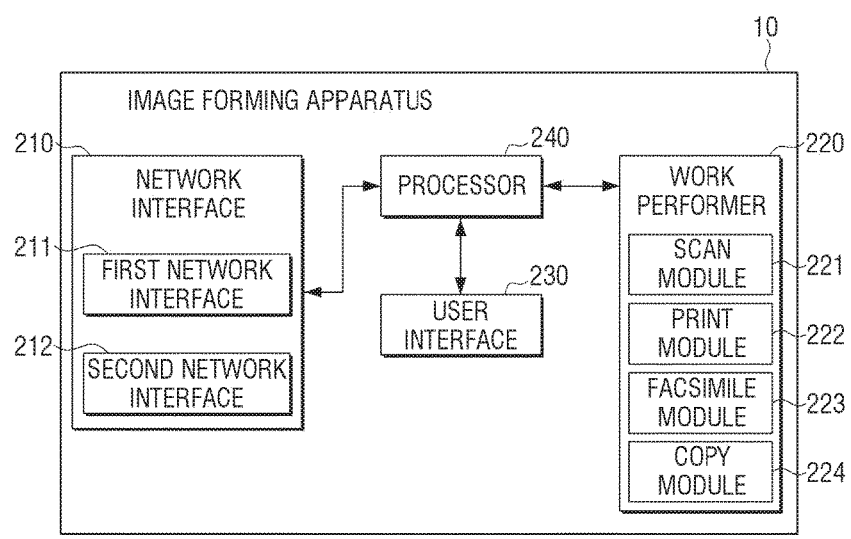
FIG. 2 is a block diagram of an image forming apparatus according to an embodiment of the present disclosure.

FIG. 2 is a block diagram of an image forming apparatus according to an embodiment of the present disclosure.

Referring to FIG. 2, the image forming apparatus 10 may include a network interface 210, a work performer 220, a user interface 230, and a processor 240.

In order to prevent obscurity of features of the present embodiment of the present disclosure, only components associated with the present embodiment will be described with reference to FIG. 2. It would be obvious to one of ordinary skill in the art that the image forming apparatus 10 includes other general-use hardware components as well as hardware components illustrated in FIG. 2.

The network interface 210 may be connected to the server 30 or the mobile apparatus 20.

The network interface 210 may be connected to the server 30 or the mobile apparatus 20 using various communication methods, for example, Wi-Fi, BT, NFC, Zigbee, $3^{rd}$ generation (3G), $3^{rd}$ generation partnership project (3GPP), LTE, or a GPS.

The network interface 210 may include a first network interface 211 and a second network interface 212. The first network interface 211 may be connected to the server 30 through the first network 51 and the second network interface 212 may be connected to the mobile apparatus 20 through the second network 52.

The network interface 210 may transmit state information required to error recovery of the image forming apparatus 10 to the mobile apparatus 20 through the second network 52 according to control of the processor 240. In response to the transmitted state information, the network interface 210 may receive a control command for error recovery of the image forming apparatus 10 from the mobile apparatus 20 through the second network 52 according to control of the processor 240.

According to an embodiment of the present disclosure, when the image forming apparatus 10 includes a USB driver module for communication with the mobile apparatus 20, the network interface 210 may be connected to the mobile apparatus 20 through the second network 52 in a USB communication manner supported by the USB driver module.

According to an embodiment of the present disclosure, when the network interface 210 is connected to the mobile apparatus 20 through the second network 52, the network interface 210 may be connected to the mobile apparatus 20 via a Wi-Fi direct communication method, a Wi-Fi communication method, or BT communication method.

According to an embodiment of the present disclosure, when the network interface 210 is connected to the mobile apparatus 20 through the second network 52, the network interface 210 may be connected to the mobile apparatus 20 using a router. For example, when the second network 52 uses a Wi-Fi communication method, the network interface 210 may be connected to the mobile apparatus 20 through a router that supports a Wi-Fi communication method.

The work performer 220 may perform at least one of a print operation, a scan operation, a copy operation, and a facsimile operation. The work performer 220 may include at least one of a scan module 221, a print module 222, a facsimile module 223, and a copy module 224. The scan module 221 may perform a scan operation on a document and generate image data of the document as a result of the scan operation. The print module 222 may perform an image forming apparatus on print data. The print module 222 may print the print data. The facsimile module 223 may transmit and receive image data through a public switched telephone network (PSTN) network. The copy module 224 may perform a copy operation on a document and generate a document including the same image data as image data of the document as a result of the copy operation. Although FIG. 2 illustrates the case in which the work performer 220 includes the scan module 221, the print module 222, the facsimile module 223, and the copy module 224, the work performer 220 may include one, two, or three of these without being limited to FIG. 2. For example, a copy function may be performed using the scan module 221 and the print module 222 without using a separate copy module.

The user interface 230 may receive an input from a user. The user interface 230 may provide a user interface so as to receive the user input. For example, the user interface 230 may display the user interface. The user interface 230 may be embodied as a panel for receiving the user input. For example, the user interface 230 may be embodied by coupling image display for providing a GUI, a display device, such as 2 line liquid crystal display (LCD), 4 line LCD, and a light emitting diode (LED), and a button for receiving user manipulation, and an input device, such as a keyboard or embodied as a touchscreen for simultaneously supporting a display operation and an input operation.

The processor 240 may control operations of components included in the image forming apparatus 10. Here, the processor 240 may be embodied as a CPU that is operated by loading a command stored in an external storage medium, such as a random access memory (RANI), a hard disk drive (HDD), and a solid state drive (SSD) and embodied as a control device, such as an application specific integrated circuit (ASIC) with a command installed therein. The processor 240 may be embodied by coupling a plurality of control devices instead of one component.

According to an embodiment of the present disclosure, when connection of the image forming apparatus 10 with the server 30 through the first network 51 is restricted, the processor 240 may control the network interface 210 to transmit the state information required for error recovery of the image forming apparatus 10 to the mobile apparatus 20 through the second network 52. In response to the transmitted state information, the processor 240 may control the network interface 210 to receive a control command required for error recovery of the image forming apparatus 10 from the mobile apparatus 20 through the second network 52. The processor 240 may recover an error of the image forming apparatus 10 according to the received control command.

According to an embodiment of the present disclosure, the processor 240 may control the network interface 210 to receive a file required for error recovery from the mobile apparatus 20 through the second network 52.

According to an embodiment of the present disclosure, the processor 240 may shut off a specific network port or deactivate a specific function in order to prevent external leakage of materials stored in the image forming apparatus 10.

According to an embodiment of the present disclosure, the processor 240 may control the network interface 210 to connect the image forming apparatus 10 to the mobile apparatus 20 through the second network 52 when connection between the image forming apparatus 10 and the mobile apparatus 20 is accepted through a user interface.

Figure 3A:
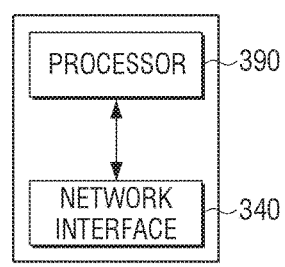
FIG. 3A is a schematic block diagram illustrating components of a mobile apparatus according to an embodiment of the present disclosure.

FIG. 3A is a schematic block diagram illustrating components of a mobile apparatus according to an embodiment of the present disclosure.

In an embodiment of the present disclosure, the mobile apparatus 20 may include at least one of, for example, a smartphone, a tablet PC, a mobile phone, a video telephone, an e-book reader, a desktop PC, a laptop PC, a netbook computer, a workstation, a server, personal digital assistant (PDA), a portable multimedia player (PMP), an MP3 player, a mobile medical device, a camera, and a wearable device. According to various embodiments of the present disclosure, the wearable device may include at least one of an accessory type device (e.g., a watch, a ring, a bracelet, an ankle bracelet, a necklace, glasses, contact lenses, or a head-mounted-device (HMD)), a fabric or clothing type device (e.g., electronic clothes), a body mounted type device (e.g., skin pad or tattoo), and a bioimplant type device (e.g., an implantable circuit).

Referring to FIG. 3A, the mobile apparatus 20 may include a network interface 340 and a processor 390.

The network interface 340 may communicate with an external device positioned outside the mobile apparatus 20 via various types of communication methods.

The network interface 340 may communicate directly with an external device or indirectly with an external device through a repeater. For example, the network interface 340 may communicate with an external device through other external devices, an access point (AP), or a base station.

The network interface 340 may be connected to the server 30 and the image forming apparatus 10. For example, the network interface 340 may be connected to the image forming apparatus 10 through the second network 52. Alternatively, the network interface 340 may be connected to the server 30 through the third network 53.

According to an embodiment of the present disclosure, the network interface 340 may receive state information required for error recovery from the image forming apparatus 10 through the second network 52 according to control of the processor 390. The network interface 340 may transmit state information required for error recovery, received by the server 30 through the third network 53, according to control of the processor 390.

According to an embodiment of the present disclosure, the network interface 340 may receive a control command required for error recovery of the image forming apparatus 10 to the server 30 through the third network 53 according to control of the processor 390. The network interface 340 may transmit the control command required for error recovery to the image forming apparatus 10 through the second network 52 according to control of the processor 390.

When the image forming apparatus 10 includes a USB driver module for communication with the mobile apparatus 20, the network interface 340 may be connected to the mobile apparatus 20 through the second network 52 in a USB communication manner supported by the USB driver module.

According to an embodiment of the present disclosure, when the network interface 340 is connected to the image forming apparatus 10 through the second network 52, the network interface 340 may be connected to the image forming apparatus 10 via a Wi-Fi direct communication method, a Wi-Fi communication method, or BT communication method.

According to an embodiment of the present disclosure, when the network interface 340 is connected to the image forming apparatus 10 through the second network 52, the network interface 340 may be connected to the image forming apparatus 10 using a router.

The processor 390 (or a controller) may control an overall operation of the mobile apparatus 20 using various programs stored in a memory.

According to an embodiment of the present disclosure, when connection of the image forming apparatus 10 with the server 30 for supporting a service for error recovery of the image forming apparatus 10 through the first network 51 is restricted, the processor 390 may control the network interface 340 to receive state information required for error recovery of the image forming apparatus 10 from the image forming apparatus 10 through the second network 52. The processor 390 may control the network interface 340 to transmit the received state information to the server 30 through the third network 53 that is different from the second network 52. The processor 390 may control the network interface 340 to receive a control command required for error recovery of the image forming apparatus 10 from the server 30 through third network 53 in response to the transmitted state information. The processor 390 may control the network interface 340 to transmit the received control command to the image forming apparatus 10 through the second network 52 so as to recover an error of the image forming apparatus 10.

According to another embodiment of the present disclosure, when a detector acquires surrounding information of the image forming apparatus 10, the processor 390 may control the network interface 340 to transmit the acquired surrounding information to the server 30 through the third network 53.

Although simple components included in a mobile apparatus have been illustrated and described thus far, various components may be additionally included in reality, which will be described below with reference to FIG. 3B.

Figure 3B:
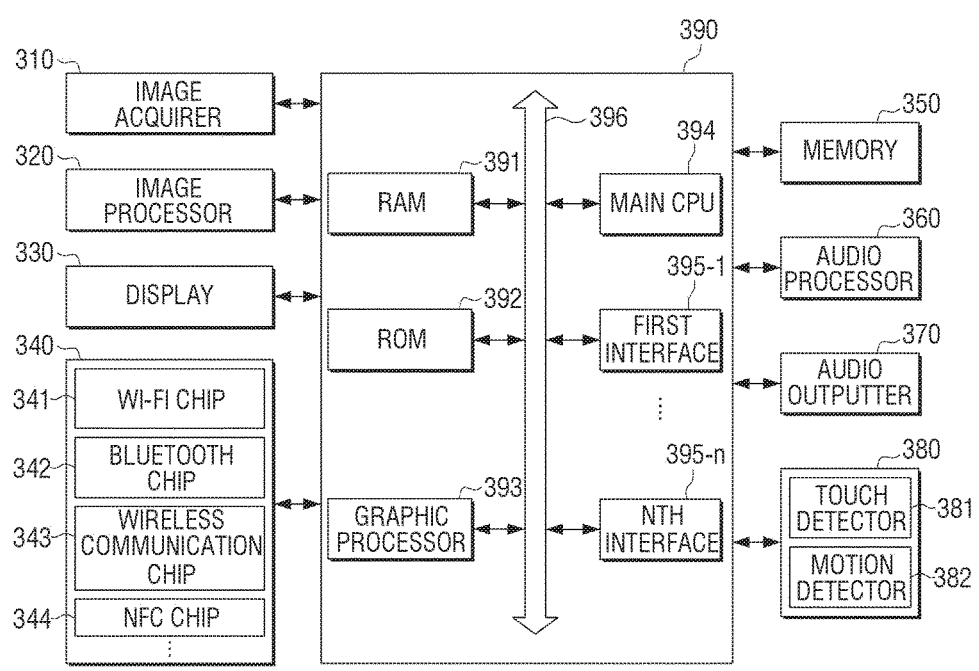
FIG. 3B is a block diagram illustrating components of a mobile apparatus according to an embodiment of the present disclosure.

FIG. 3B is a block diagram illustrating components of a mobile apparatus according to an embodiment of the present disclosure.

Referring to FIG. 3B, the mobile apparatus 20 may include an image acquirer 310, an image processor 320, a display 330, the network interface 340, a memory 350, an audio processor 360, an audio outputter 370, a detector 380, and the processor 390. The components of the mobile apparatus 20 of FIG. 3B may not be limited to the aforementioned block diagram. Accordingly, some of the components of the mobile apparatus 20 of FIG. 3B may be omitted or modified or other components may be added according to a type or objective of the mobile apparatus 20.

The image acquirer 310 may acquire image data through various sources. For example, the image acquirer 310 may receive image data from an external server and receive image data from an external device.

The image acquirer 310 may photograph an external environment to acquire image data. For example, the image acquirer 310 may be embodied as a camera for photographing the external environment of the mobile apparatus 20. In this case, the image acquirer 310 may include a lens (not shown) through which an image is transmitted and an image sensor (not shown) for detecting the image transmitted through the lens. The image sensor (not shown) may be embodied as a charge couple device (CCD) image sensor or a complementary metal-oxide semiconductor (CMOS) image sensor. The image data acquired through the image acquirer 310 may be processed by the image processor 320.

The image processor 320 may process the image data received by the image acquirer 310. The image processor 320 may perform various image processing operations, such as decoding, scaling, noise filtering, frame rate conversion, and resolution conversion on the image data.

The display 330 may display at least one of a video frame formed by processing the image data by the image processor 320 and various images generated by a graphics processor 393 in a display region.

The display 330 may be coupled to at least one of a front region, a side region, and a rear region of the mobile apparatus 20 in the form of a flexible display.

The display 330 may be coupled to a touch detector 381 to be embodied as a layered touchscreen. The touchscreen may have a function of detecting a touch input pressure as well as a touch input position and a touched area in addition to a display function and may also have a function of detecting a proximity touch as well as a real-touch.

The network interface 340 may communicate with various types of external devices according to various types of communication methods. The network interface 340 may include at least one of a Wi-Fi chip 341, a BT chip 342, a wireless communication chip 343, and an NFC chip 344. The processor 390 may communicate with an external server or various external devices using the network interface 340.

More particularly, the Wi-Fi chip 341 and the BT chip 342 may perform communication using a WiFi method and a BT method, respectively. When the Wi-Fi chip 341 or the BT chip 342 is used, various connection information items, such as a service set identifier (SSID) and a session key may be first transmitted and received, communication may be formed using the connection information items and, various information items may be transmitted and received. The wireless communication chip 343 may refer to a chip that performs communication according to various communication standards, such as Zigbee, 3G, 3GPP, and LTE. The NFC chip 344 may refer to a chip that operates using a NFC method using a band of 13.56 MHz among various radio frequency identifier (RF-ID) frequency bands of 135 kHz, 13.56 MHz, 433 MHz, 860 to 960 MHz, and 2.45 GHz.

The memory 350 may store various programs and data required for an operation of the mobile apparatus 20. The memory 350 may be embodied as a non-volatile memory, a volatile memory, a flash-memory, a HDD, a SSD, and the like. The memory 350 may be accessed by the processor 390 and the processor 390 may perform read/record/correction/deletion/update on data. In an embodiment of the present disclosure, the term 'memory' may include the memory 350, a read only memory (ROM) (not shown) in the processor 390, a RAM (not shown), or a memory card (not shown) (e.g., a micro secure digital (micro-SD) card and a memory card) installed in the mobile apparatus 20.

The memory 350 may store program and data for constituting various images to be displayed in a display region of the display 330.

The audio processor 360 may process audio data of image content. The audio processor 360 may perform various processing operations, such as decoding, amplification, or noise filtering on audio data. The audio data processed by the audio processor 360 may be output to the audio outputter 370.

The audio outputter 370 may output various notification sounds or voice messages as well as the audio data on which the various processing operations, such as decoding, amplification, or noise filtering are performed by the audio processor 360. More particularly, the audio outputter 370 may be embodied as a speaker but is merely an example and, thus, the audio outputter 370 may be embodied as an output terminal for outputting audio data.

The detector 380 may detect various user interactions. The detector 380 may detect at least one of various changes of pose change, illumination change, acceleration change, and the like, of the mobile apparatus 20 and transmit an electrical signal corresponding thereto to the processor 390. For example, the detector 380 may detect state change performed based on the mobile apparatus 20, generate a detection signal according to the state change, and transmit the detection signal to the processor 390. In an embodiment of the present disclosure, the detector 380 may include various sensors. In this regard, power may be supplied to at least one sensor that is set according to control of the detector 380 during driving of the mobile apparatus 20 (or based on user setting) and the state change of the mobile apparatus 20 may be detected.

The detector 380 may include various sensors and may be configured by including at least one of any type of detecting devices for detecting state change of the mobile apparatus 20. For example, the detector 380 may include at least one of various detecting electronic devices, such as a touch sensor, an acceleration sensor, a gyro sensor, an illuminance sensor, a proximity sensor, a pressure sensor, a noise sensor (e.g., a microphone), a video sensor (e.g., a camera module), a pen detection sensor, and a timer.

The detector 380 may be divided into the touch detector 381, a motion detector 382, and the like, according to detection purpose but is not limited thereto and, thus, the detector 380 may be divided according to more various purposes. This may not refer to physical division and at least one sensor may be coupled to function as the detections 381 and 382. According to an embodying method, some of components or functions of the detector 380 may be included in the processor 390.

The detector 380 may further include a pen detector (e.g., a pen recognition panel) (not shown). The pen detector may detect pen input of a user according to management of a pen for user touch (e.g., a stylus pen, a digitizer pen) and output a pen proximity event value or a pen touch event value.

A microphone (not shown) may receive user voice (e.g., photograph start, photograph stop, or photograph finish) for control of a medical device through the mobile apparatus 20 and recognize the user voice through a voice recognition module. The recognition result may be transmitted to the processor 390. In this case, the voice recognition module may not be a microphone and may be positioned in a portion of the processor 390 or outside the mobile apparatus 20.

The processor 390 (or a processor) may overall operation of the mobile apparatus 20 using various programs stored in the memory 350.

The processor 390 may include a RAM 391, a ROM 392, the graphics processor 393, a main CPU 394, first to $n^{th}$ interfaces 395-1 to 395-$n$, and a bus 396. In this case, the RAM 391, the ROM 392, the graphics processor 393, the main CPU 394, and the first to $n^{th}$ interfaces 395-1 to 395-$n$ may be connected to each other through the bus 396.

The RAM 391 may store an operating system (O/S) and an application program. When the mobile apparatus 20 boots, the O/S may be stored in the RAM 391 and various application data items selected by a user may be stored in the RAM 391.

The ROM 392 may store a command set for system booting. When a turn-on command is input to supply power, the main CPU 394 may copy the O/S stored in the memory 350 to the RAM 391 according to the command stored in the ROM 392 and execute the O/S to perform system booting. When booting is terminated, the main CPU 394 may copy various application programs stored in the memory 350 to the RAM 391 and execute the application programs copied to the RAM 391 to perform various operations.

The graphics processor 393 may generate an image including various objects, such as an item, an image, and a text using a calculator (not shown) and a render (not shown). Here, the calculator may be a component for calculating an attribute value, such as a coordinate value, a shape, a size, and color of each object according to a layout of an image using the control command received from the detector 380. The renderer may be a component for generating various layouts of images including an object based on the attribute value calculated by the calculator. The image generated by the renderer may be displayed in a display region of the display 330.

The main CPU 394 may access the memory 350 and perform booting using the O/S stored in the memory 350. The main CPU 394 may perform various operations using various programs, contents, data items, and the like, stored in the memory 350.

The first to $n^{th}$ interfaces 395-1 to 395-$n$ may be connected to the aforementioned various components. One of the first to $n^{th}$ interfaces 395-1 to 395-$n$ may be a network interface connected to an external device through a network.

FIGS. 4, 5A, 5B, 5C, and 6 are diagrams illustrating various connection methods between an image forming apparatus and a mobile apparatus according to various embodiments of the present disclosure.

Figure 4:
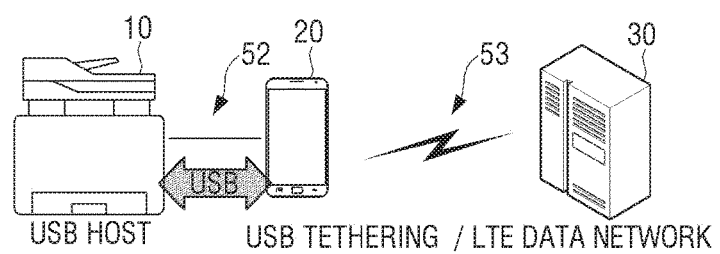
FIGS. 4, 5A, 5B, 5C, and 6 are diagrams illustrating various connection methods between an image forming apparatus and a mobile apparatus according to various embodiments of the present disclosure.

Referring to FIG. 4, the image forming apparatus 10 may be connected to the mobile apparatus 20 through the second network 52 using a wired communication method.

Figure 5A:
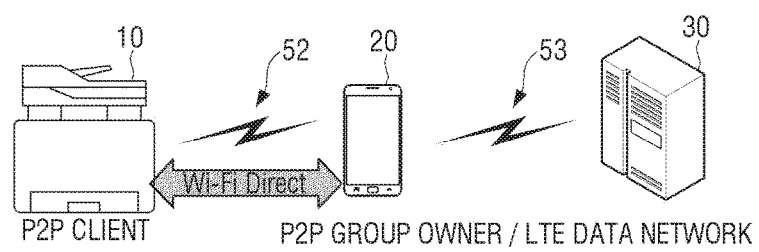
Figure 5B:
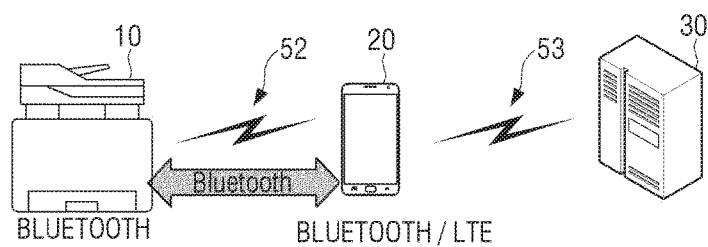
Figure 5C:
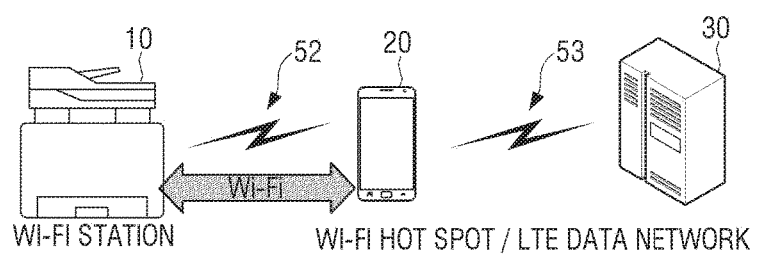

Referring to FIGS. 5A, 5B, and 5C, the image forming apparatus 10 may be connected to the mobile apparatus 20 through the second network 52 using a wireless communication method.

Figure 6:
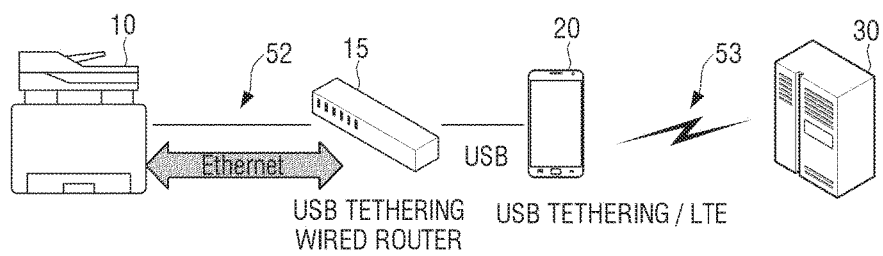

Referring to FIG. 6, the image forming apparatus 10 may be connected to the mobile apparatus 20 using a router 15.

According to an embodiment of the present disclosure, referring to FIG. 4, the image forming apparatus 10 may be connected to the mobile apparatus 20 using a wired communication method in order to recover error.

A situation in which connection with the mobile apparatus 20 is performed using a wired communication method may be, for example, a situation in which the image forming apparatus 10 is not capable of being connected to an external network due to the firewall system 62. The situation may be a situation in which the image forming apparatus 10 is not capable of being connected to an external network due to function error of a network associated with a wired local area network (LAN) of the image forming apparatus 10. In addition, the situation may be a situation in which the image forming apparatus 10 is not capable of being connected to the mobile apparatus 20 using a wireless communication method due to function error of a network associated with a wireless LAN of the image forming apparatus 10.

In consideration of the aforementioned situations, the image forming apparatus 10 may include a USB driver module for communication with the mobile apparatus 20. In this case, the image forming apparatus 10 may perform one-to-one communication with the mobile apparatus 20 using a USB cable according to a USB communication method supported by the USB driver module.

For example, when the mobile apparatus 20 is connected to the image forming apparatus 10 using a USB cable, the image forming apparatus 10 may recognize the mobile apparatus 20 as an external MODEM apparatus and use the mobile apparatus 20 as if a wireless LAN card is installed. Accordingly, the image forming apparatus 10 may transmit a network packet generated by the image forming apparatus 10 to the server 30 through the mobile apparatus 20 using a USB tethering function of the mobile apparatus 20.

Although only a USB method has been described as an example of a wired method thus far, when both the image forming apparatus 10 and the mobile apparatus 20 include a LAN port, a wired LAN method may be used for connection and various wired communication methods other than a wired LAN method may be used for connection.

According to another embodiments of the present disclosure, referring to FIGS. 5A to 5C, the image forming apparatus 10 may be connected to the mobile apparatus 20 using a wireless communication method in order to recover error.

A situation in which connection with the mobile apparatus 20 is performed using a wireless communication method may be, for example, a situation in which the image forming apparatus 10 is not capable of being connected to an external network due to the firewall system 62. In addition, the situation may be a situation in which the image forming apparatus 10 is not capable of being connected to an external network due to function error of a network related to a wired LAN of the image forming apparatus 10.

Referring to FIG. 5A, the image forming apparatus 10 may be connected to the mobile apparatus 20 with Pear to Pear (P2P) according to a Wi-Fi Direct wireless LAN communication method. In general, during connection between the image forming apparatus 10 and the mobile apparatus 20 via a Wi-Fi Direct communication method, the image forming apparatus 10 may have a high intent value or operate as an autonomous group owner (GO) to function as an owner of a Wi-Fi Direct group, and the mobile apparatus 20 may function as a client. However, in order to effectively use a communication function of the mobile apparatus 20, an intent value of the image forming apparatus 10 may be lowered and, thus, the mobile apparatus 20 may function as an owner of a Wi-Fi Direct group and the image forming apparatus 10 may function as a client. Accordingly, the mobile apparatus 20 may relay a network packet generated by the image forming apparatus 10 using a Wi-Direct communication method and transmit the network packet to the server 30.

Referring to FIG. 5B, the image forming apparatus 10 may be connected to the mobile apparatus 20 via a Wi-Fi communication method using a hot spot function of the mobile apparatus 20. In this case, the mobile apparatus 20 may execute a hot spot function to form a Wi-Fi wireless network and may be operated as an AP device of a Wi-Fi wireless network. The image forming apparatus 10 may be operated in a station mode and connected to the server 30 through a Wi-Fi wireless network formed by the mobile apparatus 20.

Although the case in which the mobile apparatus 20 is connected directly to the image forming apparatus 10 using an AP method has been described thus far, the image forming apparatus 10 and the mobile apparatus 20 may be connected through, i.e., using a router for supporting an AP in reality.

Referring to FIG. 5C, the image forming apparatus 10 may be connected to the mobile apparatus 20 via a BT communication method using a BT tethering function of the mobile apparatus 20. In this case, the mobile apparatus 20 may execute a BT tethering function to form a BT wireless network. The image forming apparatus 10 may be connected to the server 30 through a BT wireless network formed by the mobile apparatus 20.

When the image forming apparatus 10 is connected to an external network through the mobile apparatus 20 using the aforementioned wireless communication method or wired communication method, materials that are stored in the image forming apparatus 10 and need security may be externally exposed.

In order to prevent this, when the image forming apparatus 10 needs to be connected to an external network through the mobile apparatus 20, a security module installed in the image forming apparatus 10 may provide a manager dedicated user interface (e.g., a GUI or a RUI) for accepting or rejecting connection between the image forming apparatus 10 and the mobile apparatus 20. The manager dedicated user interface may be described below.

When the image forming apparatus 10 needs to be connected to an external network through the mobile apparatus 20, the image forming apparatus 10 may limit a network transmission control protocol (TCP) or user datagram protocol (UDP) port. For example, the image forming apparatus 10 may permit only communication via a TCP or UDP port required to perform a remote service for error recovery through the mobile apparatus 20 and block communication a TCP or UDP port used to transmit a material. Accordingly, the image forming apparatus may be connected to the mobile apparatus 20 through the second network 52 using the TCP or UDP port, communication of which is permitted by the image forming apparatus 10 for error recovery.

According to another embodiment of the present disclosure, referring to FIG. 6, the image forming apparatus 10 may be connected to the mobile apparatus 20 using the router 15 for error recovery.

A situation in which connection with the mobile apparatus 20 is performed using the router 15 may be, for example, a situation in which the image forming apparatus 10 is not capable of being connected to an external network due to the firewall system 62.

In this case, the image forming apparatus 10 may be connected to the mobile apparatus 20 using, for example, the router 15 as a USB tethering router and may be connected to the server 30 through a network (e.g., a cellular network, such as LTE) to be provided by the mobile apparatus 20. To this end, as illustrated in FIG. 6, the image forming apparatus 10 may be connected to the router 15 via a wired LAN (e.g., Ethernet) and the router 15 may be connected to the mobile apparatus 20 via a USB cable.

When the image forming apparatus 10 is connected to the mobile apparatus 20 using the router 15, the image forming apparatus 10 has a difficulty in recognizing whether tethering is performed through the mobile apparatus 20 or a general wired LAN network and, thus, there may be worry that materials that are stored in the image forming apparatus 10 and need security are externally exposed. Accordingly, the image forming apparatus 10 may include a security module for detecting that an Ethernet cable is disconnected and re-connected or a network connected to the image forming apparatus 10 is changed. The security module may provide a user interface (e.g., a pop-up menu) for accepting or rejecting connection with the server 30 through the mobile apparatus 20 by a manager when the aforementioned situation occurs. In addition, even if the manager accepts connection with the server 30 through the mobile apparatus 20, the image forming apparatus 10 may permit only communication using a TCP or UDP port required to perform a remote service and shut communication using a TCP or UDP port used to transmit a material.

The image forming apparatus 10 may further provide an image including a user interface checking whether the image forming apparatus 10 is connected to the mobile apparatus 20 through the router 15 in response to the router 15 being detected. In this case, in response to a user request for rejecting connection through the router 15, the image forming apparatus 10 may be connected to the mobile apparatus 20 using the router 15.

Figure 7:
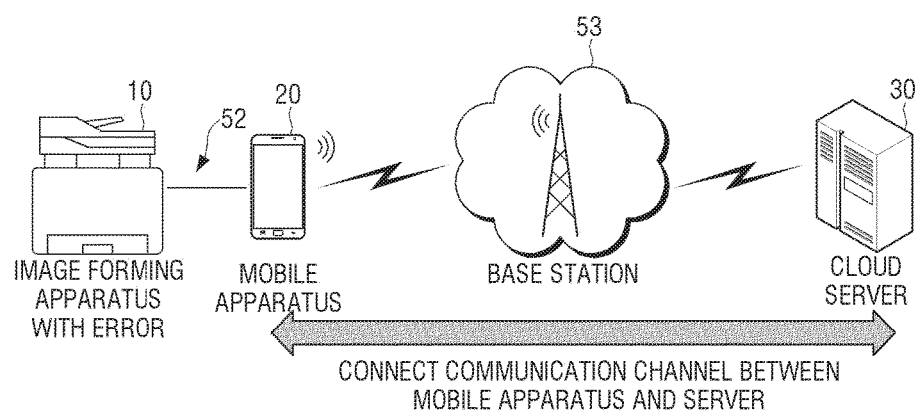
FIG. 7 is a diagram illustrating a situation in which a mobile apparatus is connected to a server according to an embodiment of the present disclosure.

FIG. 7 is a diagram illustrating a situation in which a mobile apparatus is connected to a server according to an embodiment of the present disclosure.

Referring to FIG. 7, the mobile apparatus 20 may form a communication channel with the server 30 through a broadband network (e.g., an LTE data network).

According to an embodiment of the present disclosure, when the image forming apparatus 10 us connected to the server 30 using a tethering function of the mobile apparatus 20, the mobile apparatus 20 may function as a relay of re-transmitting a network packet generated by the image forming apparatus 10 to the server 30. In this case, the mobile apparatus 20 simply functions as a relay and, thus, substantial communication may be performed between the image forming apparatus 10 and the server 30.

For example, when the image forming apparatus 10 generates a connection request packet, the generated connection request packet may be transmitted to the server 30 through the mobile apparatus 20. The server 30 that receives the connection request packet may generate a connection acceptance packet in response to the connection request packet. When the server 30 generates the connection acceptance packet, the generated connection acceptance packet may be re-transmitted to the image forming apparatus 10 through the mobile apparatus 20. Accordingly, a communication channel between the image forming apparatus 10 and the mobile apparatus 20 may be formed. As the communication channel is formed, the engineer device 40 may transmit and receive data to and from the image forming apparatus 10 through the server 30 and control the image forming apparatus 10.

According to another embodiment of the present disclosure, a dedicated application may be installed in the mobile apparatus 20 such that the mobile apparatus 20 is connected to the server 30.

When the dedicated application is installed in the mobile apparatus 20, a communication channel may be formed between the mobile apparatus 20 and the server 30 using a client function supported by the dedicated application. The dedicated application may communicate with the server 30 to receive a control command for the image forming apparatus 10 and transmit the received control command to the image forming apparatus 10 using the formed communication channel.

Accordingly, the engineer device 40 that accesses the server 30 may control the image forming apparatus 10 using the dedicated application. The engineer device 40 may control the mobile apparatus 20 using the dedicated application. For example, the engineer device 40 may control a camera, a GPS sensor, various sensors, and the like, of the mobile apparatus 20. As a control result, the engineer device 40 may acquire surrounding information of the image forming apparatus 10, required for error recovery of the image forming apparatus 10.

The mobile apparatus 20 and the server 30 may be connected to each other through a security network (e.g., virtual private network (VPN)) so as to enhance a communication security level between the mobile apparatus 20 and the server 30.

A user of the engineer device 40 may remotely control the mobile apparatus 20 to acquire surrounding information of the image forming apparatus 10 using a function of the mobile apparatus 20. For example, according to a remote control command of the engineer device 40, the mobile apparatus 20 may capture an image of the image forming apparatus 10 or a surrounding image and video of the image forming apparatus 10 using a camera included in the mobile apparatus 20 and transmit the captured image to the engineer device 40 through the server 30. The mobile apparatus 20 may acquire position information of the image forming apparatus 10 or position information of the mobile apparatus 20 adjacent to the image forming apparatus 10 using a GPS sensor of the mobile apparatus 20 and transmit the information to the engineer device 40 through the server 30. The mobile apparatus 20 may acquire information on humidity, altitude, and the like, of a place in which the image forming apparatus 10 is positioned using various sensors included in the mobile apparatus 20 and transmit the information to the engineer device 40 through the server 30.

FIG. 8 is a diagram illustrating a case in which an error of an image forming apparatus is recovered using a mobile apparatus according to an embodiment of the present disclosure.

Referring to FIG. 8, an error may be generated with respect to a specific function of the image forming apparatus 10. For example, a Wi-Fi Direct function of the image forming apparatus 10 may not be operated.

Accordingly, in operation 801, the image forming apparatus 10 may enter a remote service mode and may be connected to the mobile apparatus 20 through the second network 52.

For example, the image forming apparatus 10 and the mobile apparatus 20 may be connected through a USB cable to perform a USB tethering function of the mobile apparatus 20.

The image forming apparatus 10 may detect that connection with the mobile apparatus 20 is attempted and provide an image for determining whether remote service support for error recovery of the image forming apparatus 10 is accepted to the user interface 230 of the image forming apparatus 10. In this case, an image (e.g., a passport input image) for manager authentication may be further provided before or after an image for checking whether a remote service is accepted.

When the remote service support is accepted through manage authentication, the image forming apparatus 10 may enter a remote service mode such that the image forming apparatus 10 may establish connection with the mobile apparatus 20. For example, the image forming apparatus 10 may determine an interface for communication with the mobile apparatus 20. For example, when the image forming apparatus 10 includes a plurality of network interfaces for Ethernet access, Wi-Fi access, USB access, and the like, a gateway address set in a primary network interface may be used as a default gateway address for Internet access. In this case, the image forming apparatus 10 may change the primary network interface for Internet access to an interface for communication with the mobile apparatus 20.

The image forming apparatus 10 may receive communication setting information (e.g., a new internet protocol (IP) address, a gateway address, and a domain name system (DNS) address) from the mobile apparatus 20 and set a new primary network interface for communication with the mobile apparatus 20 according to the received information.

Accordingly, a communication channel may be formed between the image forming apparatus 10 and the mobile apparatus 20 so as to connect image forming apparatus 10 and the mobile apparatus 20 to each other.

Whether the image forming apparatus 10 and the mobile apparatus 20 are connected, a connection state therebetween, and a connection procedure may be indicated in an image provided by the user interface 230 of the image forming apparatus 10.

When the image forming apparatus 10 is connected to the mobile apparatus 20, the image forming apparatus 10 may establish connection with the server 30 using the mobile apparatus 20 as a relay, in operation 802.

For example, the image forming apparatus 10 may generate a connection request packet and transmit the connection request packet to the mobile apparatus 20 for connection with the server 30. The mobile apparatus 20 may relay and transmit the received connection request packet to the server 30. The connection request packet may include, for example, an IP address of the server 30 and a port number of the server 30. The server 30 that receives the connection request packet may transmit a response to the connection request to the image forming apparatus 10 through the mobile apparatus 20.

Accordingly, a communication channel using the mobile apparatus 20 as a relay may be formed between the image forming apparatus 10 and the server 30 so as to connect the image forming apparatus 10 and the server 30 to each other.

Whether the image forming apparatus 10 and the server 30 are connected, a connection state therebetween, and a connection procedure may be indicated in an image provided by the user interface 230 of the image forming apparatus 10.

According to an embodiment of the present disclosure, the image forming apparatus 10 may be connected to the server 30 with an enhanced security level.

For example, the image forming apparatus 10 may pre-store or preset at least one of a uniform resource locator (URL) and uniform resource name (URN) of the server 30. Accordingly, the image forming apparatus 10 may be connected only to the server 30 indicated by at least one of the pre-stored or preset URL and URN.

The image forming apparatus 10 may be connected to the server 30 using a protocol with enhanced security. For example, the image forming apparatus may communicate with the server 30 using a protocol with enhanced security, such as a hypertext transfer protocol (HTTP) or hypertext transfer protocol over secure sockets layer (HTTPS) (HTTP over SSL).

In order to prevent materials that are stored in the image forming apparatus 10 and need security from being externally exposed, the image forming apparatus 10 may block a network port that is not related to the remote service support during entrance into a remote service mode. For example, the image forming apparatus 10 may block a network port (e.g., a file transfer protocol (FTP) 21 port, a server message block (SMB) 445 port, and a simple mail transfer protocol (SMTP) 25,587 port) for externally transmitting materials (e.g., a file or an image) stored in the image forming apparatus 10.

The image forming apparatus 10 may deactivate a function of exposure of materials during entrance into a remote service mode. For example, the image forming apparatus 10 may deactivate a scan to send function (e.g., a scan to FTP function, a scan to SMB function, and a scan to Email function) of externally transmitting scanned materials.

According to the aforementioned security enhancing method, a user interface for setting a security level of the image forming apparatus 10 may be indicated in an image provided by the user interface 230 of the image forming apparatus 10. The user interface may include, for example, an item for selecting whether a protocol with enhanced security is used, an item for selecting whether a specific port is blocked, or an item for selecting whether a scan to send function is used.

When the image forming apparatus 10 is connected to the server 30 using the mobile apparatus 20 as a relay, the image forming apparatus 10 may transmit identification information of the image forming apparatus 10 to the server 30, in operation 803. The server 30 that receives the identification information of the image forming apparatus 10 may register the received identification information in a database of the server 30.

A user of the engineer device 40 may remotely receive request for error recovery of the image forming apparatus 10. Accordingly, in operation 804, the engineer device 40 may be connected to the server 30 and search for and select the image forming apparatus 10 that needs to be error-recovered. When the image forming apparatus 10 is selected, the engineer device 40 may be remotely connected to the image forming apparatus 10 through the server 30 and the mobile apparatus 20.

When the engineer device 40 is remotely connected to the image forming apparatus 10, the engineer device 40 may transmit a state information request signal related to error of the image forming apparatus 10 to the image forming apparatus 10, in operation 805. For example, the engineer device 40 may request the image forming apparatus 10 for Wi-Fi setting information of the image forming apparatus 10.

In response to the request, the image forming apparatus 10 may transmit state information related to error of the image forming apparatus 10 as in operation 806. For example, the image forming apparatus 10 may transmit Wi-Fi on/off information and Wi-Fi Direct on/off information to the engineer device 40.

Upon receiving the state information related to error of the image forming apparatus 10, a user of the engineer device 40 may analyze the received state information to discover a problem of the image forming apparatus 10. For example, the user of the engineer device 40 may check that a Wi-Fi Direct function of the image forming apparatus 10 is in an off-state and recognize that the Wi-Fi Direct function needs to be changed to an on-state.

Accordingly, the engineer device 40 may transmit a control command required for error recovery of the image forming apparatus 10 to the image forming apparatus 10 as in operation 807. For example, the engineer device 40 may transmit a command for turning on the Wi-Fi Direct function to the image forming apparatus 10.

The image forming apparatus 10 that transmits the control command may execute the received control command. For example, the image forming apparatus 10 may recover an error of the image forming apparatus 10 according to the received control command. For example, the image forming apparatus 10 may execute the command for turning on the Wi-Fi Direct function to perform the Wi-Fi Direct function so as to recover an error of the image forming apparatus 10.

The aforementioned procedure of remotely controlling the image forming apparatus 10 by the engineer device 40 may be performed by accessing an embedded web server provided by the image forming apparatus 10 and controlling a remote user interface (RUI).

As error of the image forming apparatus 10 is recovered, connection between the image forming apparatus 10 and the mobile apparatus 20 may be released in operation 808. For example, when the mobile apparatus 20 is removed from the image forming apparatus 10, the image forming apparatus 10 may detect this and release the current remote service mode. The image forming apparatus 10 may change a primary network interface to an original state.

Figure 9A:
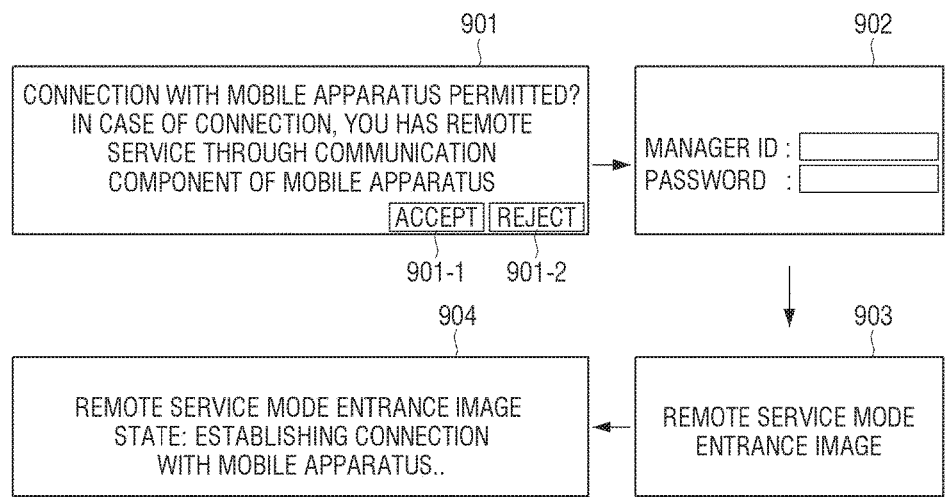
FIGS. 9A and 9B are diagrams illustrating an image provided during error recovery of an image forming apparatus according to various embodiments of the present disclosure.
Figure 9B:
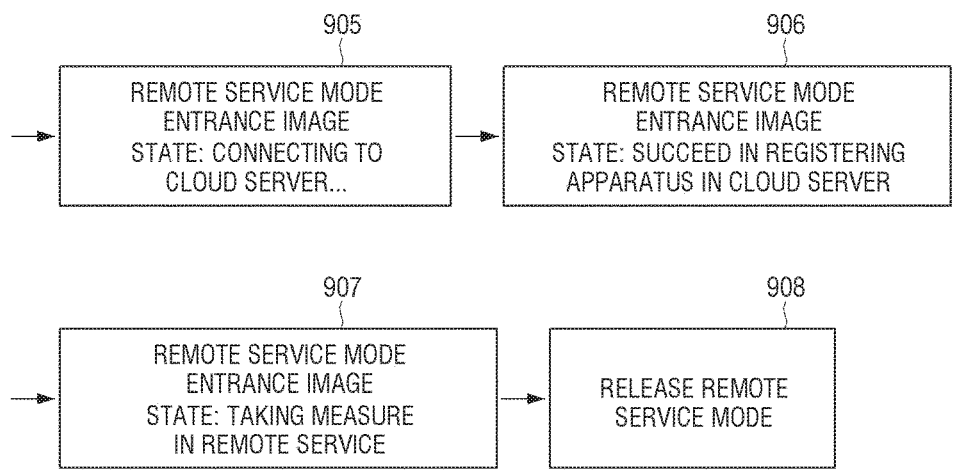

FIGS. 9A and 9B are diagrams illustrating an image provided during error recovery of an image forming apparatus according to an embodiment of the present disclosure.

Referring to FIG. 9A, the image forming apparatus 10 may enter a remote service mode and may be connected to the mobile apparatus 20 through the second network 52.

In this case, in operation 901 of FIG. 9A, the image forming apparatus 10 may provide an image containing an accept button 901-1 and a reject button 901-2, for checking whether remote service support for error recovery of the image forming apparatus 10 is accepted, through the user interface 230.

When the user of the image forming apparatus 10 selects the accept button 901-1, the image forming apparatus 10 may provide an image for manage authentication in operation 902 of FIG. 9A. The manage authentication image may include, for example, a manger ID input window, and a password input window.

When the user of the image forming apparatus 10 inputs a manager ID and password through an input window, the image forming apparatus 10 may enter a remote service mode. Accordingly, in operation 903 of FIG. 9A, the image forming apparatus 10 may provide a remote service mode entrance image indicating entrance into the remote service mode.

When the image forming apparatus 10 enters the remote service mode, the image forming apparatus 10 may establish connection with the mobile apparatus 20. Accordingly, in operation 904 of FIG. 9A, the image forming apparatus 10 may provide an image containing connection state information indicating that the image forming apparatus 10 is establishing connection with the mobile apparatus 20.

Referring to FIG. 9B, the image forming apparatus 10 may establish connection with the server 30 using the mobile apparatus 20 as a relay. Accordingly, in operation 905 of FIG. 9B, the image forming apparatus 10 may provide an image containing the connection state information indicating that the image forming apparatus 10 is establishing connection with the server 30 (e.g., a cloud server).

The image forming apparatus 10 may transmit identification information of the image forming apparatus 10 to the server 30. The server 30 may register the received identification information in a database of the server 30 and transmit check information indicating that the identification information is registered in the database of the server 30. In operation 906 of FIG. 9B, the image forming apparatus 10 that receives the check information may provide an image containing information indicating that the image forming apparatus 10 is registered in a server in order to recover an error of the image forming apparatus 10.

The engineer device 40 may be remotely connected to the image forming apparatus 10 so as to recover an error of the image forming apparatus 10. Accordingly, in operation 907 of FIG. 9B, the image forming apparatus 10 may provide an image containing information indicating that a remote service for error recovery of the image forming apparatus 10 is currently performed.

When error of the image forming apparatus 10 is recovered, a remote service mode of the image forming apparatus 10 may be released. Accordingly, in operation 908 of FIG. 9B, the image forming apparatus 10 may provide an image containing information indicating that a remote service mode is released.

Figure 10:
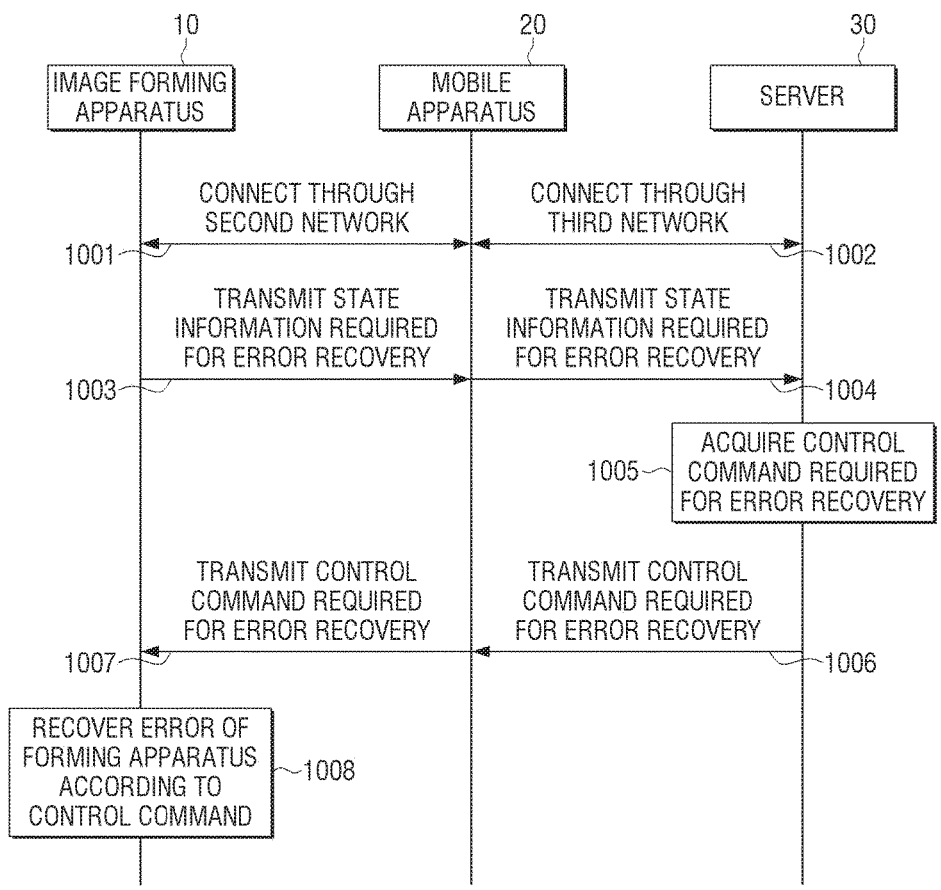
FIG. 10 is a flowchart illustrating error recovery of an image forming apparatus in a system including a server, the image forming apparatus, and a mobile apparatus according to an embodiment of the present disclosure.

FIG. 10 is a flowchart illustrating error recovery of an image forming apparatus in a system including a server, the image forming apparatus, and a mobile apparatus, according to an embodiment of the present disclosure.

Referring to FIG. 10, when connection of the image forming apparatus 10 with the server 30 through the first network 51 is restricted, the image forming apparatus 10 may be connected to the mobile apparatus 20 through the second network 52 that is different from the first network 51, in operation 1001. In operation 1002, the mobile apparatus 20 may be connected to the server 30 through the third network 53 that is different from the second network 52.

In this case, in operation 1003, the image forming apparatus 10 may transmit state information required for error recovery of the image forming apparatus 10 to the mobile apparatus 20 through the second network 52.

In operation 1004, the mobile apparatus 20 that receives the state information may transmit the received state information required for error recovery to the server 30 through the third network 53.

In operation 1005, in response to the state information that needs to be error-recovered, the server 30 may acquire a control command required for error recovery. For example, the server 30 may receive the control command required for error recovery of the image forming apparatus 10 of a user of the engineer device 40 from the engineer device 40. The server 30 may automatically generate the control command required for error recovery or acquire the control command from a memory of the server 30.

In operation 1006, the server 30 may transmit the acquired control command to the mobile apparatus 20 through the third network 53.

In operation 1007, the mobile apparatus 20 that receives the control command may transmit the received control command required for error recovery to the image forming apparatus 10 through the second network 52.

In operation 1008, the image forming apparatus 10 that receives the control command may recover an error of the image forming apparatus 10 according to the received control command.

Figure 11:
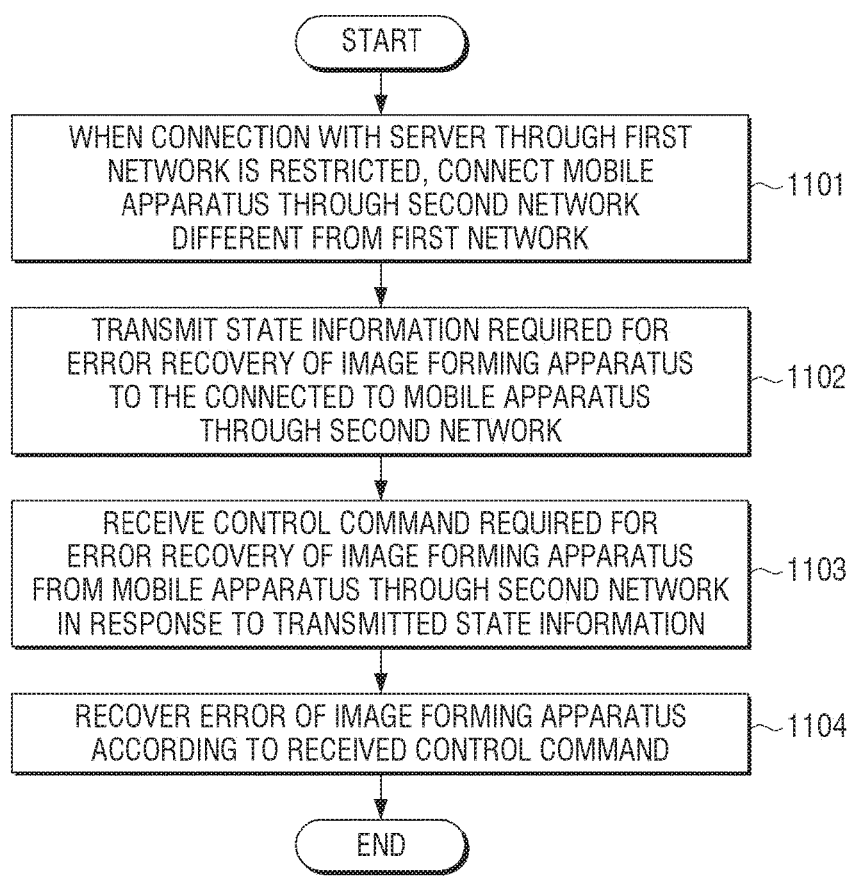
FIG. 11 is a flowchart illustrating error recovery of an image forming apparatus in the image forming apparatus according to an embodiment of the present disclosure.

FIG. 11 is a flowchart illustrating error recovery of an image forming apparatus in the image forming apparatus according to an embodiment of the present disclosure.

Referring to FIG. 11, in operation 1101, when the image forming apparatus 10 is capable of being connected to the server 30 through the first network 51, if connection with the first network 51 is restricted due to error of an operation or network function of the firewall system 62, the image forming apparatus 10 may be connected to the mobile apparatus 20 through the second network 52 that is different from the first network 51.

Accordingly, the image forming apparatus 10 may have a remote service for error recovery. In this case, the image forming apparatus 10 may block a specific port or deactivate a specific function in order to prevent stored materials from being externally exposed. In addition, the image forming apparatus 10 may provide an image for checking whether remote service support for error recovery is accepted and enter a remote service mode according to user acceptance.

The image forming apparatus 10 may use various communication methods for connection with the mobile apparatus 20 through the second network 52. For example, the image forming apparatus 10 may be connected to the mobile apparatus 20 through the second network 52 according to a USB communication method. In this case, the image forming apparatus 10 may include a USB driver module for communication with the mobile apparatus 20.

The image forming apparatus 10 may be connected to the mobile apparatus 20 through the second network 52 using a Wi-Fi Direct communication method, a Wi-Fi communication method, or a BT communication method. The image forming apparatus 10 may be connected to the mobile apparatus 20 through the second network 52 using a router.

In operation 1102, the image forming apparatus 10 may transmit state information required for error recovery of the image forming apparatus 10 to the connected mobile apparatus 20 through the second network 52. The mobile apparatus 20 may transmit the received state information to the server 30 through the third network 53 that is different from the second network 52. In response thereto, the mobile apparatus 20 may receive the control command required for error recovery through the third network 53.

In operation 1103, the image forming apparatus 10 may receive a control command required for error recovery of the image forming apparatus 10 from the mobile apparatus 20 through the second network 52.

In this case, the image forming apparatus 10 may receive a file command required for error recovery of the image forming apparatus 10 from the mobile apparatus 20 through the second network 52. The file required for error recovery may be, for example, a firmware of a recent version.

In operation 1104, the image forming apparatus 10 may recover an error of the image forming apparatus 10 according to the received control command.

FIG. 12 is a flowchart illustrating error recovery of an image forming apparatus in a mobile apparatus according to an embodiment of the present disclosure.

Referring to FIG. 12, in operation 1201, when the image forming apparatus 10 is capable of being connected to the server 30 through the first network 51, connection with the first network 51 may be restricted due to error of an operation or network function of the firewall system 62. In this case, the mobile apparatus 20 may be connected to the image forming apparatus 10 through the second network 52 that is different from the first network 51.

In operation 1202, the mobile apparatus 20 may receive state information required for error recovery of the image forming apparatus 10 from the image forming apparatus 10 through the second network 52.

In operation 1203, the mobile apparatus 20 may transmit the received state information to the server 30 through the third network 53 that is different from the second network 52.

In this case, the mobile apparatus 20 may acquire surrounding information of the image forming apparatus 10 and transmit the acquired surrounding information to the server 30 through the third network 53.

In operation 1204, the mobile apparatus 20 may receive a control command required for error recovery of the image forming apparatus 10 from the server 30 through the third network 53 in response to the transmitted state information.

In operation 1205, the mobile apparatus 20 may transmit the received control command to the image forming apparatus 10 through the second network 52 so as to recover an error of the image forming apparatus 10.

The embodiments of the present disclosure may be written as computer programs and can be implemented in general-use digital computers that execute the programs using a computer readable recording medium.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a RAM, Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the skilled in the art that various changes in form and details may be made therein without departing from the spirit and scope of the present disclosure as defined by the appended claims and their equivalents.

What is claimed is:

1. A method of recovering errors of an image forming apparatus connectable to a server for supporting a service for error recovery of the image forming apparatus, the method comprising:

connecting, when connection between the image forming apparatus and the server through a first network is restricted, to a mobile apparatus through a second network different from the first network;

transmitting state information required for error recovery of the image forming apparatus to the connected mobile apparatus through the second network;

receiving a control command required for error recovery of the image forming apparatus from the mobile apparatus through the second network, in response to the transmitted state information;

recovering errors of the image forming apparatus according to the received control command; and at least one of blocking a specific network port or deactivating a specific function in order to prevent a material stored in the image forming apparatus from being externally exposed, wherein the control command is received from the server through a third network, in response to state information transmitted to the server by the mobile apparatus through the third network different from the second network.

2. The method of claim 1, wherein, when the image forming apparatus comprises a universal serial bus (USB) driver to communicate with the mobile apparatus, the connecting to the mobile apparatus through the second network comprises connecting the mobile apparatus according to a USB communication method supported by the USB driver.

3. The method of claim 1, wherein the connecting to the mobile apparatus through the second network comprises connecting the mobile apparatus according to a Wireless Fidelity (Wi-Fi) Direct communication method, a Wi-Fi communication method, or a Bluetooth (BT) communication method.

4. The method of claim 1, wherein the connecting to the mobile apparatus through the second network comprises connecting to the mobile apparatus through a router.

5. The method of claim 1, further comprising receiving a file required for the error recovery from the mobile apparatus through the second network.

6. The method of claim 1, wherein the connecting to the mobile apparatus through the second network by the image forming apparatus comprises:

providing a user interface for accepting or rejecting connection between the image forming apparatus and the mobile apparatus; and connecting, in response to connection between the image forming apparatus and the mobile apparatus being accepted through the user interface, the image forming apparatus to the mobile apparatus through the second network.

7. The method of claim 1, wherein the state information required for the error recovery comprises at least one of firmware version information, an error occurrence code, consumables usage information, a graphics user interface (GUI) image, a remote user interface (RUI) image or link state, log information, system setting information, paper cassette setting information, printer setting information, copy setting information, facsimile setting information, scan setting information, network setting information, or security setting information of the image forming apparatus.

8. The method of claim 1, wherein the control command required for the error recovery comprises at least one of a command for upgrading firmware of the image forming apparatus to a recent version, a command for displaying a graphics user interface (GUI) image or a remote user interface (RUI) image for remote access, a command for changing setting information, or a command for powering on/off or rebooting software.

9. The method of claim 1, wherein the image forming apparatus is connected to the mobile apparatus through the second network according to a local distance communication method, and wherein the mobile apparatus is connected to the server through the third network according to a remote distance communication method.

10. An image forming apparatus connectable to a server for supporting a service for error recovery of the image forming apparatus, the image forming apparatus comprising:

a network interface to:
       connect to the server through a first network, and
       connect to a mobile apparatus through a second network different from the first network;

a work performer comprising at least one of a scanner, a facsimile device, a copy device, or a printer; and a processor to:
       control the network interface to transmit state information required for error recovery of the image forming apparatus to the mobile apparatus through the second network when connection between the image forming apparatus and the server through the first network is restricted, receive a control command required for the error recovery of the image forming apparatus from the mobile apparatus through the second network, in response to the transmitted state information, recover an error of the image forming apparatus according to the received control command, and at least one of block a specific network port or deactivate a specific function in order to prevent a material stored in the image forming apparatus from being externally exposed, wherein the control command is received from the server through a third network, in response to state information transmitted to the server by the mobile apparatus through the third network different from the second network.

11. The image forming apparatus of claim 10, wherein the image forming apparatus further comprises a universal serial bus (USB) driver to communicate with the mobile apparatus, and wherein, when the network interface is connected to the mobile apparatus through the second network, the network interface is connected to the mobile apparatus according to a USB communication method supported by the USB driver.

12. The image forming apparatus of claim 10, wherein the processor controls the network interface to receive a file required for the error recovery from the mobile apparatus through the second network.

13. The image forming apparatus of claim 10,
wherein the processor provides a user interface to accept or reject connection between the image forming apparatus and the mobile apparatus, and
wherein the processor controls the network interface to connect the image forming apparatus to the mobile apparatus through the second network when connection between the image forming apparatus and the mobile apparatus is accepted through the user interface.

14. The image forming apparatus of claim 10, wherein the state information required for the error recovery comprises at least one of firmware version information, an error occurrence code, consumables usage information, a graphics user interface (GUI) image, a remote user interface (RUI) image or link state, log information, system setting information, paper cassette setting information, printer setting information, copy setting information, facsimile setting information, scan setting information, network setting information, or security setting information of the image forming apparatus.

15. The image forming apparatus of claim 10, wherein the control command required for the error recovery comprises at least one of a command for upgrading firmware of the image forming apparatus to a recent version, a command for displaying a graphics user interface (GUI) image or a remote user interface (RUI) image for remote access, a command for changing setting information, or a command for powering on/off or rebooting software.

16. The image forming apparatus of claim 10,
wherein the image forming apparatus is connected to a mobile apparatus through the second network according to a local distance communication method, and
wherein the mobile apparatus is connected to the server through the third network according to a remote distance communication method.

* * * * *